United States Patent [19]

Takada et al.

[11] Patent Number: 5,012,700
[45] Date of Patent: May 7, 1991

[54] HYDRAULIC CONTROL DEVICE FOR AUTOMATIC TRANSMISSION FOR VEHICLE HAVING CLUTCH DISENGAGE CONTROL MEANS INDEPENDENT OF CLUTCH ENGAGE CONTROL MEANS

[75] Inventors: Mitsuru Takada; Hiroshi Itoh, both of Toyota; Tokuyuki Takahashi, Aichi; Makoto Funahashi, Toyota, all of Japan

[73] Assignee: Toyota Jidosha Kabushiki Kaisha, Toyota, Japan

[21] Appl. No.: 388,486

[22] Filed: Aug. 2, 1989

[30] Foreign Application Priority Data

Aug. 2, 1988 [JP] Japan .................................. 63-192965
Nov. 2, 1988 [JP] Japan .................................. 63-278345
Nov. 25, 1988 [JP] Japan .................................. 63-297785

[51] Int. Cl.$^5$ .......................................... B60K 41/06
[52] U.S. Cl. .......................................... 74/869; 74/868
[58] Field of Search .......................... 74/867, 868, 869

[56] References Cited

U.S. PATENT DOCUMENTS

| | | | |
|---|---|---|---|
| 4,637,281 | 1/1987 | Vanselous | 74/869 |
| 4,665,776 | 5/1987 | Sugano | 74/867 |
| 4,722,251 | 2/1988 | Sumiya et al. | 74/868 |
| 4,730,521 | 3/1988 | Hayasaki et al. | 74/868 X |
| 4,829,853 | 5/1989 | Sakaguchi | 74/869 |

FOREIGN PATENT DOCUMENTS 60211152 10/1985 Japan .................................. 74/869

Primary Examiner—Leslie A. Braun
Assistant Examiner—Benjamin Levi
Attorney, Agent, or Firm—Oblon, Spivak, McClelland, Maier & Neustadt

[57] ABSTRACT

For an automatic transmission for a vehicle such as an automobile having a speed stage shifting mechanism including parallelly arranged first and second hydraulically operated input clutches and adapted to provide the 3rd speed stage in which the first and second input clutches $C_1$ and $C_2$ are both engaged and the overdrive 4th stage in which the clutch $C_1$ is disengaged and the clutch $C_2$ is engaged, the engagement of the clutch $C_1$ in the 3rd speed stage being not essential unless engine brake availability is required, a hydraulic control device has a hydraulic pressure supply control device for variably controlling speed of supply of a hydraulic pressure to the first input clutch $C_1$ according to conditions for engaging the first input clutch such whether it is a kickdown of an overdrive inhibition, and a hydraulic pressure exhaustion control device for controlling speed of exhaustion of a hydraulic pressure from the first input clutch $C_1$ independently of the hydraulic pressure supply control device to be substantially higher than the speed in the supply.

5 Claims, 7 Drawing Sheets

| RANGE | SPEED STAGE | FIRST SOL-ENOID (400) | SECOND SOL-ENOID (410) | THIRD SOL-ENOID (420) | C1 (38) | C2 (40) | C3 (42) | C4 (44) | B1 (46) | B2 (48) | F1 (34) | F2 (36) | REMARKS |
|---|---|---|---|---|---|---|---|---|---|---|---|---|---|
| R | ALLOWED | | | | | | | | | | | | |
|   | INHIBITED | | | ○ | | | ○ | | | ○ | | | ABOVE A PREDETERMINED SPEED |
| D | 1st | ○ | | | ○ | | | | | | | ○ | |
|   | 2nd | ○ | ○ | | ○ | | | | ○ | | ○ | ○ | |
|   | 3rd | | | ○ | ○ | ○ | | ○ | | | ○ | | |
|   | 4th | | ○ | ○ | | ○ | | ○ | | | | | |
| S | 1st | ○ | | | ○ | | | | | | | ○ | |
|   | 2nd | ○ | ○ | | ○ | | | ○ | | | ○ | ○ | |
|   | 3rd | | | | ○ | ○ | | ○ | | | ○ | | WHEN SOLENOID VALVE FAILED |
|   | (3rd) | | ○ | | | ○ | | | | ○ | ○ | | |
| L | 1st | ○ | | | ○ | | | ○ | ○ | | ○ | ○ | |
|   | 2nd | ○ | ○ | | ○ | ○ | | ○ | ○ | | ○ | ○ | |
|   | (2nd) | | | | ○ | | | ○ | | | | ○ | WHEN SOLENOID VALVE FAILED |

FIG. 2

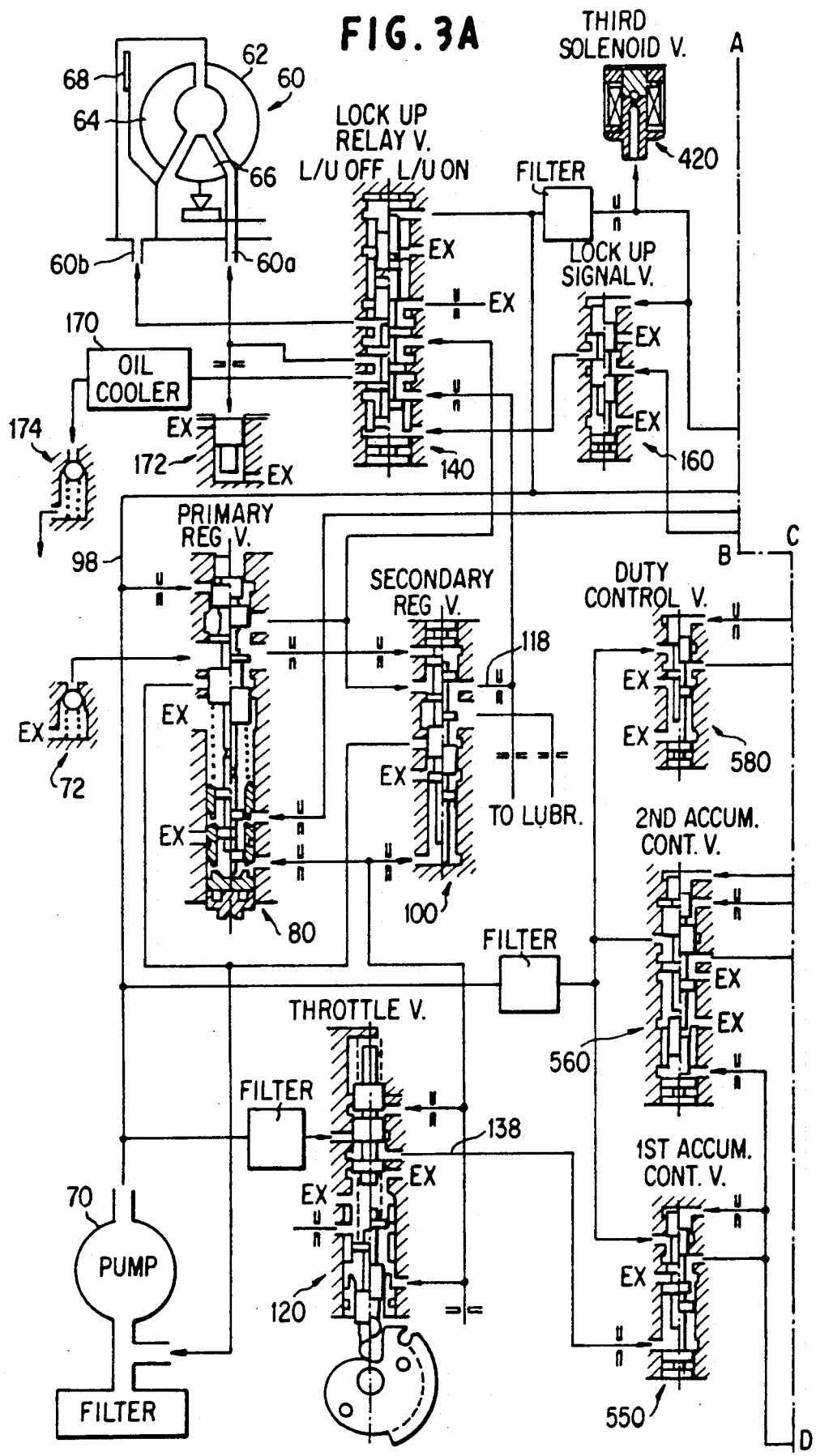

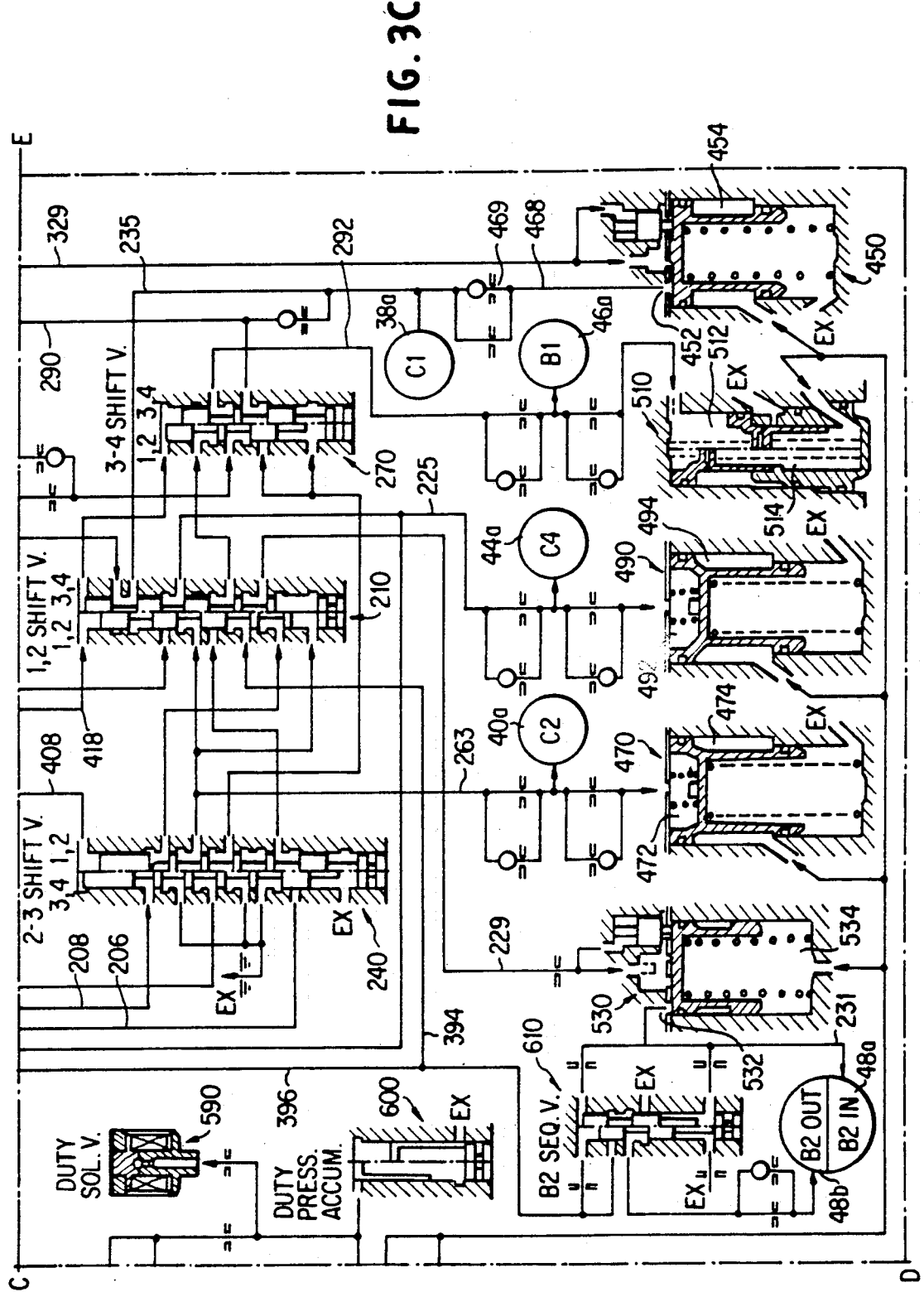

HYDRAULIC CONTROL DEVICE FOR AUTOMATIC TRANSMISSION FOR VEHICLE HAVING CLUTCH DISENGAGE CONTROL MEANS INDEPENDENT OF CLUTCH ENGAGE CONTROL MEANS

BACKGROUND OF THE INVENTION

1. Field of the Invention

The present invention relates to a hydraulic control device for an automatic transmission for a vehicle such as an automobile, and more particularly, to a hydraulic control device for such an automatic transmission having two parallelly arranged input clutches which are selectively engaged or disengaged in providing a plurality of speed stages.

2. Description of the Prior Art

In Japanese patent application No. 62-195471 filed on Aug. 5, 1987 and laid open to public on Feb. 13, 1989, two of the inventors of the present invention have proposed an automatic transmission for a vehicle such as an automobile in which a speed stage shifting mechanism includes two parallelly arranged input clutches and is adapted so that a first one of the two input clutches is engaged when it provides a first speed stage, a second speed stage and a third speed stage, whereas a second one of the two input clutches is engaged when it provides the third speed stage and a fourth speed stage. However, in this speed stage shifting mechanism the engagement of said first input clutch is not essential for setting up said third speed stage unless engine brake availability is required since a one way is provided in parallel with said first input clutch, said one way clutch being adapted to be automatically engaged when the automatic transmission operates in a normal engine driving condition. On the other hand, the engagement of said first input clutch is essential for setting up said second speed stage in which said second input clutch is disengaged.

In the above-mentioned automatic transmission, assuming that the vehicle is running with the automatic transmission being set up in the fourth speed stage, when the automatic transmission is shifted down from the fourth speed stage to the second speed stage by a deep stepping down of the accelerator pedal, that is, the so-called kickdown, said first input clutch needs to be engaged relatively quickly so that there occurs no moment of virtual disconnection of the transmission in the transition from said second clutch engagement to said first clutch engagement since otherwise the engine will rev up and a substantial speed shift shock will follow it.

On the other hand, there are two possibilities for the transmission being shifted down from the fourth speed stage to the third speed stage. In a first possibility, the automatic transmission is shifted down from the fourth speed stage to the third speed stage by a stepping down of the accelerator pedal, that is, the so-called kick down, and in a second possibility the transmission is shifted down from the fourth speed stage to the third speed stage by the prohibition of the overdrive stage, provided that the fourth speed stage is an overdrive stage as mostly so in the modern automobiles and there is provided an overdrive selection means such as an overdrive cutoff button.

When the transmission is shifted down from the fourth speed stage to the third speed stage in the above-mentioned type automatic transmission, it is desired that, when the downshifting is due to the kickdown, said first input clutch is engaged relatively slowly as compared in the downshifting due to the overdrive prohibition, or in other words, when the downshifting is due to the overdrive prohibition, said first clutch is engaged relatively quickly as compared in the downshifting due to the kickdown, because, when the automatic transmission is shifted down from the fourth speed stage to the third speed stage by the kickdown, after a reaction brake (in fact brake $B_1$ described hereinunder) was disengaged, engine rotational speed rises and the above-mentioned one way clutch (in fact one way clutch $F_1$ described hereinunder) is automatically put into engagement, and therefore said first clutch may be slowly engaged or rather should be slowly engaged not to cause an abrupt engine braking, while in the downshifting due to the overdrive prohibition, since the accelerator pedal will not be stepped on, engine rotational speed will not rise to that said one way clutch is swiftly engaged, and therefore, if the engagement of the first clutch is delayed, the vehicle will run in an inertial condition as if it is running with the manual shift lever set to the neutral position. Such an inertial running condition, when it occurs without a positive instruction by the driver, will give the driver a feeling of danger of loss of engine braking.

Thus, it is noted that in the automatic transmission of the above-mentioned type the speed of engagement of said first clutch should be variably controlled according to the stepping on condition of the accelerator pedal or, more fundamentally, the output power of the engine.

The above-mentioned first input clutch is disengaged when the transmission is shifted from the third speed stage to the fourth speed stage. Further, there is another possibility for said first input clutch being disengaged during running of the vehicle. That is a shifting of the manual shift lever from the D range position to the neutral position. When said first clutch is disengaged in the upshifting from the third speed stage to the fourth speed stage, it is desirable that the disengagement is accomplished quickly. However, when the manual shift lever was shifted from the D range position to the neutral position while the vehicle is running under the D range in the third speed stage, it is desirable that the disengagement of said first clutch is slightly delayed in order to avoid any substantial shock to occur.

SUMMARY OF THE INVENTION

Therefore, it is a primary object of the present invention to provide a hydraulic control device for an automatic transmission for a vehicle such as an automobile including a speed stage shifting mechanism of the above-mentioned type in which the engagement speed of said first input clutch is variably controlled in accordance with the conditions for the engagement of said first input clutch on the one hand while on the other hand the disengagement of said first input clutch is controlled independently of the speed of engagement thereof to be generally quicker than in the engagement thereof.

A secondary object of the present invention is to provide a hydraulic control device which accomplishes the above-mentioned primary object with further availability of varying the speed of disengaging said first input clutch according to the condition of disengaging said first clutch.

According to the present invention, the above-mentioned primary object is accomplished, for an automatic transmission for a vehicle such as an automobile having a speed stage shifting mechanism including parallelly arranged first and second hydraulically operated input clutches and adapted to provide a first speed stage in which said first and second input clutches are both engaged and a second speed stage higher than said first speed stage in which said first input clutch is disengaged and said second input clutch is engaged, the engagement of said first input clutch in said first speed stage being not essential unless engine brake availability is required, by a hydraulic control device comprising a hydraulic pressure supply control means for variably controlling speed of supply of a hydraulic pressure to said first input clutch according to conditions for engaging said first input clutch, and a hydraulic pressure exhaustion control means for controlling speed of exhaustion of a hydraulic pressure from said first input clutch independently of said hydraulic pressure supply control means.

Further, in order to accomplish said secondary object of the present invention, in the hydraulic control device of the above-mentioned construction said hydraulic pressure exhaustion control means may be so constructed as to variably control said speed of exhaustion of the hydraulic pressure from said first input clutch according to conditions for disengaging said first input clutch.

Said hydraulic pressure exhaustion control means may control speed of exhaustion of the hydraulic pressure from said first input clutch to be substantially higher than speed of supply of the hydraulic pressure to said first input clutch controlled by said hydraulic pressure supply control means.

Further, said hydraulic pressure exhaustion control means may control speed of exhaustion of the hydraulic pressure from said first input clutch to be relatively higher in disengaging said first input clutch for upshifting from said first speed stage to said second speed stage than in disengaging said first input clutch due to shifting of a manual shift range from a drive range to a neutral range.

BRIEF DESCRIPTION OF THE DRAWINGS

In the accompanying drawings;

FIG. 2 is a table showing combinations of energization of the solenoid valves and engagement of the clutches and brakes for setting up the respective speed stages;

DESCRIPTION OF THE PREFERRED EMBODIMENT

In the following the invention will be described in detail with respect to a preferred embodiment thereof with reference to the accompanying drawings.

Figure 1:
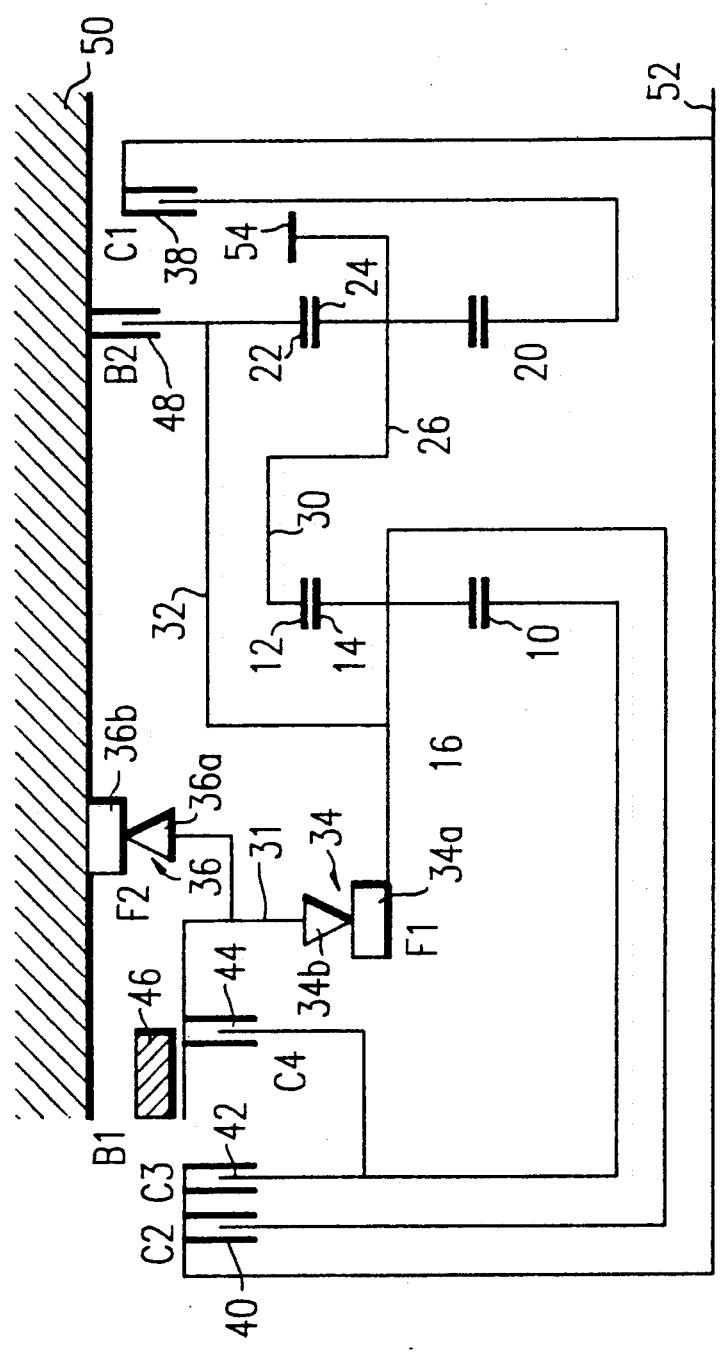
FIG. 1 is a schematic illustration of a planetary gear type speed change device for an automatic transmission having substantially the same speed shift gear mechanism as that disclosed in the above-mentioned Japanese patent application to which the hydraulic control device according to the present invention is applicable.

Referring to FIG. 1, the speed stage shifting mechanism herein shown comprises a first planetary gear mechanism having a first sun gear 10, a first ring gear 12 coaxial with said first sun gear 10, a first planetary pinion 14 meshing with said first sun gear 10 and said first ring gear 12, and a first carrier 16 rotatably supporting said first planetary pinion 14, and a second planetary gear mechanism having a second sun gear 20, a second ring gear 22 coaxial with said second sun gear 20, a second planetary pinion 24 meshing with said second sun gear 20 and said second ring gear 22, and a second carrier 26 rotatably supporting said second planetary pinion 24. The first ring gear 12 is connected with the second carrier 26 by a connecting member 30. The first carrier 16 is connected with the second ring gear 22 by a connecting member 32.

A first one way clutch 34 and a second one way clutch 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch which also has an outer race 36b connected with the housing 50. The first one way clutch 34 is engaged when the outer race 34b would rotate relative to the inner race 34a in a first rotational direction and slips when the inner race 34a rotates relative to the outer race 34b in a second direction opposite to said first direction. Similarly, the second one way clutch 36 is engaged when the inner race 36a would rotate relative to the outer race 36b in said first direction and slips when the inner race 36a rotates relative to the outer race 36a in said second direction.

The second carrier 26 is connected with an annular gear member 54 which operates as an output rotational member of this speed stage shifting mechanism.

A first clutch 38 is provided between the second sun gear 20 and an input shaft 52 for selectively connecting these two members with one another. A second clutch 40 is provided between the first carrier 16 and the input shaft 52 for selectively connecting these two members with one another. A third clutch 42 is provided between the first sun gear 10 and the input shaft 52 for selectively connecting these two members with one another. A fourth clutch 44 is provided between the first sun gear 10 and the connecting member 31 for selectively connecting the sun gear 10 with the outer race 34b of the one way clutch 34 and the inner race 36b of the one way clutch 36.

A first brake 46 is provided between the connecting member 31 and the housing 50 for selectively fixing the connecting member 31 relative to the housing 50. A second brake 48 is provided between the combination of the second ring gear 22 and the first carrier 16 and the housing 50 for selectively fixing the second ring gear 22 and the first carrier 16 with respect to the housing 50.

The manner of providing a first speed stage, a second speed stage, a third speed stage (direct connection stage), a fourth speed stage (overdrive stage) and a reverse stage is shown in Table 1 and FIG. 2. In Table 1 and FIG. 2 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage with the effect of engine braking.

When the ration of the number of gear teeth of the first ring gear 12 to that of the first sun gear 10 is $r_1$, and the ration of the number of gear teeth of the second ring gear 22 to that of the second sun gear 20 is $r_2$, speed change gear ratios at the respective speed stages are as shown in Table 2.

Figure 3B:
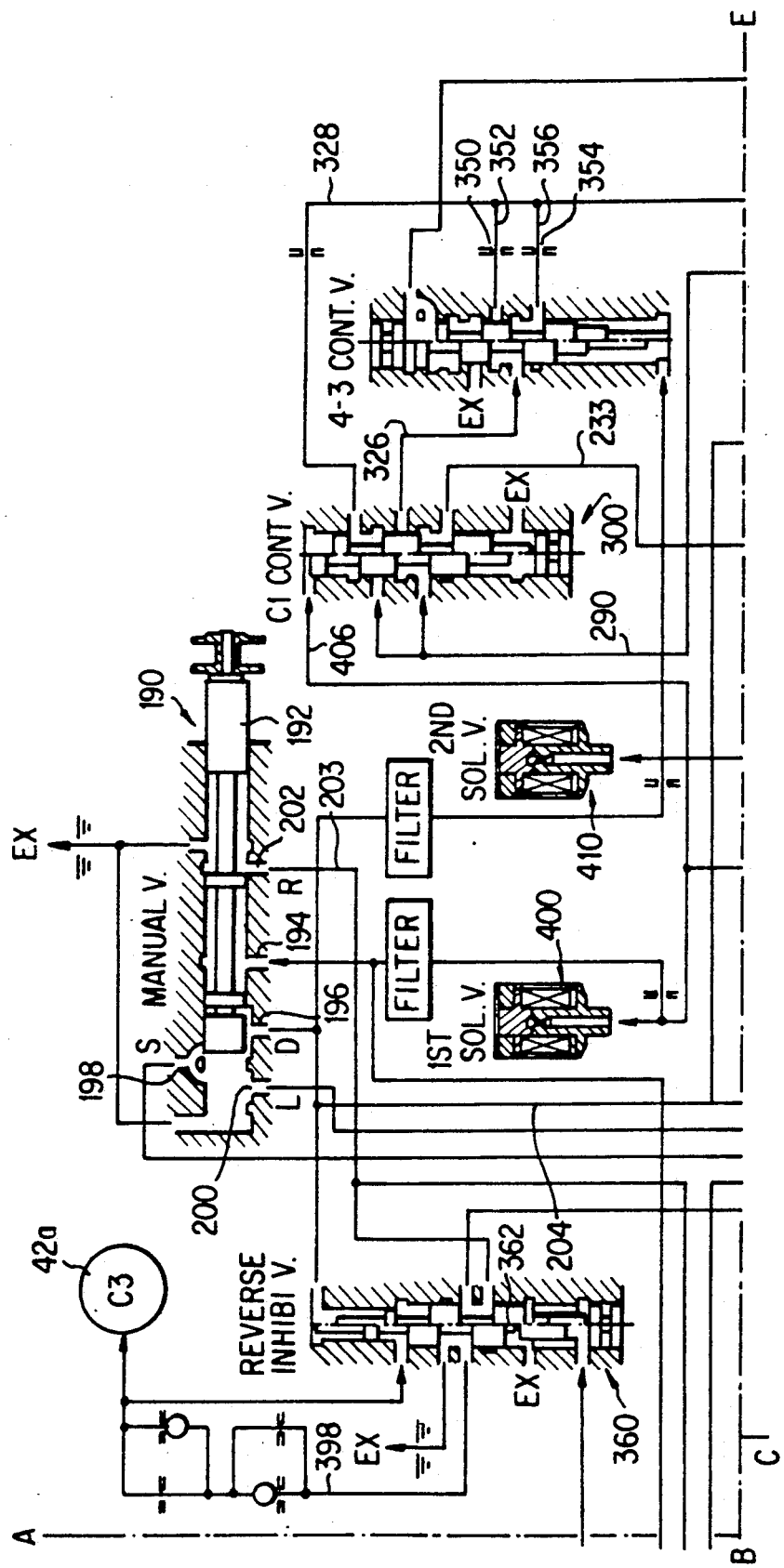
FIG. 3 is a diagram showing an embodiment of a hydraulic control device for an automatic transmission for a vehicle according to the present invention.

The first clutch 38, the second clutch 40, the third clutch 42, the fourth clutch 44, the first brake 46 and the second brake 48 are all of a hydraulically operating type having, as shown in FIG. 3, hydraulic pressure chambers 38a, 40a, 42a, 44a, 46a and 48a plus 48b, respectively, and are adapted to be engaged when a hydraulic pressure is supplied to the hydraulic pressure chambers and are disengaged when the hydraulic pressure has been exhausted from the hydraulic pressure chambers. The supply and the exhaust of the hydraulic pressure to and from these hydraulic pressure chambers are carried out by a hydraulic control device such as shown in FIG. 3.

The input shaft 52 of the above-mentioned planetary gear type speed change device is drivingly connected with a motor such as an internal combustion engine not shown in the figure via a fluid torque converter 60 such as shown in FIG. 3.

The fluid torque converter 60 is of a three elements two phases type comprising a pump impeller 62 drivingly connected with an output member of the motor, a turbine rotor 64 drivingly connected with the input shaft 52 of the planetary gear type speed stage shifting mechanism, and a stator 66 rotatable only in one direction. The fluid torque converter 60 further comprises a lock-up clutch 68 which is engaged to connect the pump impeller 62 directly with the turbine rotor 64 when a hydraulic pressure is supplied to its port 60a and is disengaged when a hydraulic pressure is supplied to its port 60b. The supply of hydraulic pressure to the ports 60a and 60b is carried out by the hydraulic control device shown in FIG. 3.

The outline of the hydraulic control device will be described with reference to FIGS. 3–5.

The hydraulic control device comprises a pump 70 which takes in an from a reservoir not shown in the figure and supplies the oil to a primary regulator valve 80 generally called a line pressure control valve and also to a throttle valve 120. The maximum value of the hydraulic pressure supplied by the pump 70 to the primary regulator valve 80 is restricted by a pressure relief valve 72.

The throttle valve 120 provides a hydraulic pressure which varies in accordance with the load on the engine and is generally called a throttle pressure in a passage 138.

The primary regulator valve 80 is supplied with the throttle pressure and a reverse boost pressure and provides the line pressure which generally increases in accordance with increase of the throttle opening in a passage 98 and a hydraulic pressure for a secondary regulator valve 100 generally called a converter pressure control valve.

The secondary regulator valve 100 is supplied with the throttle pressure and provides a converter pressure (lubricating oil pressure) in a passage 118. The line pressure in the passage 98 is supplied to a port 194 of a manual valve 190.

The manual valve 190 is of a conventional structure and has a spool 192 adapted to be operated by a hand of a driver and selectively provides the line pressure supplied to the port 194 at a D port 196 in the D range, at an S port 198 in the 2 range at an L port 200 in the L range, and at an R port 202 in the R range.

The line pressure supplied to the D port 196 is conducted through a passage 204 to a D port 214 of a 1-2 shift valve 210, a D port 246 of a 2-3 shift valve 240 through a passage 204, and a D port 274 of a 3-4 shift valve 270 through a passage 207. The line pressure supplied to the S port 198 is conducted through a passage 206 to an S port 248 of the 2-3 shift valve 240. The line pressure supplied to the L port 200 is conducted through a passage 208 to an L port 250 of the 2-3 shift valve 240. The line pressure supplied to the R port 202 is conducted through a passage 203 to a reverse inhibit valve 360.

Figure 4:
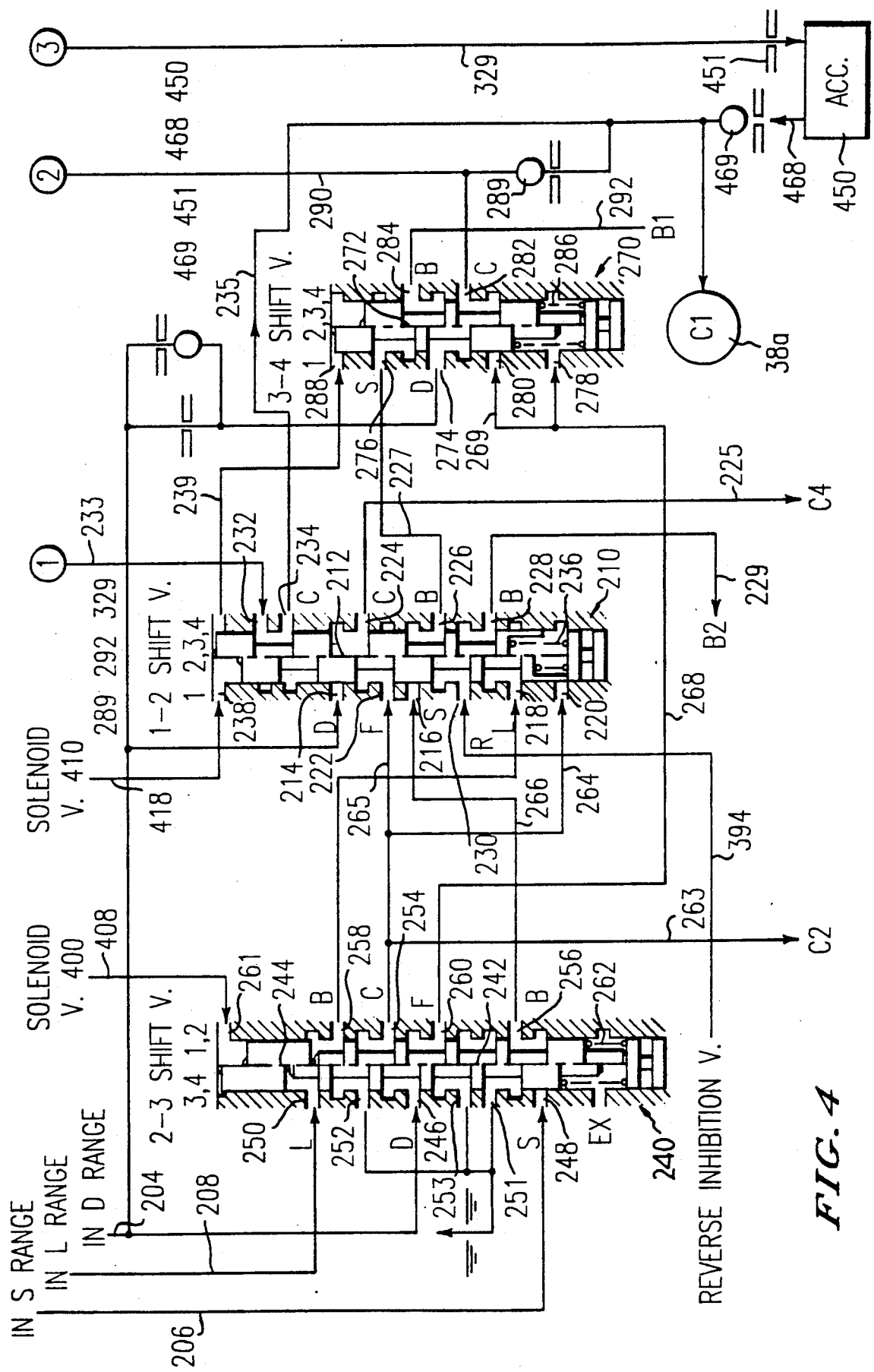
FIGS. 4 and 5 are diagrams of essential portions of the hydraulic control device according to the present invention.

As shown in FIG. 4 the 2-3 shift valve 240 comprises a spool element 242 and a plug element 244, and in addition to the above-mentioned ports further comprises drain ports 251, 252 and 253, a clutch port 254, brake ports 256 and 258 and a fail safe port 260. When a hydraulic pressure is supplied to a control port 261, the plug element 244 and the spool element 242 are shifted downward in the figure to a descended shift position as shown in the right half portion thereof by overcoming the spring force of a compression coil spring 262 so as to connect the clutch port 254 with the drain port 252, the brake port 256 with the S port 248, the brake port 258 with the L port 250, and the fail safe port 260 with the D port 246, respectively. In contrast, when no hydraulic pressure is supplied to the control port 261, the plug element 244 and the spool element 242 are shifted upward in the figure to an ascended shift position as shown in the left half portion thereof by the spring force of the compressing coil spring 262 so as to connect the clutch port 254 with the D port 246, and the brake ports 256 and 258 and the fail safe port 260 with the drain ports 251, 252 and 253, respectively.

The supply of the hydraulic pressure to the control port 261 is controlled by a first solenoid valve 400.

The clutch port 254 is connected through a passage 263 with the hydraulic pressure chamber 40a of the second clutch 40 and an accumulator chamber 472 of an accumulator 470 for the clutch $C_2$. The clutch port 254 is also connected through a passage 264 with a hold port 220 of the 1-2 shift valve 210, and also through a passage 265 with a fail safe port (drain port) 222 of the 1-2 shift valve 210. The brake port 256 is connected through a passage 266 with the S port 216 of the 1-2 shift valve 210. The brake port 258 is connected through a passage 267 with the L port 218 of the 1-2 shift valve 210. The fail safe port 260 is connected through a passage 268 with a hold port 278 of the 3-4 shift valve 270 and also connected through a passage 269 with a drain port 280 of the 3-4 shift valve 270.

As also shown in FIG. 4, the 1-2 shift valve 210 comprises a spool element 212, and in addition to the above-mentioned ports further comprises a clutch port 224, brake ports 226 and 228, an R port 230, a port 232 and a clutch port 234. When a hydraulic pressure is supplied to a control port 238 the spool element 212 is shifted downward in the figure to a descended position as shown in the left half portion thereof by overcoming the spring force of a compression coil spring 236 so as to connect the clutch port 224 with the fail safe port 222, the brake port 226 with the R port 230, and the brake port 228 with the L port 218, while isolating the port 232 from the clutch port 234. In contrast, when no hydraulic pressure is supplied to the control port 238, the spool element 212 is shifted upward as shown in the right half portion thereof to an ascended shift position by the spring force of the compression coil spring 236 so as to connect the clutch port 224 with the D port 214, the brake port 226 with the S port 216, the brake port 228 with the R port 230, and the port 232 with the clutch port 234.

The supply of the hydraulic pressure to the control port 238 is controlled by a second solenoid valve 410. The control port 238 is connected through a passage 239 with the control port 288 of the 3-4 shift valve 270.

The clutch port 224 is connected through a passage 225 with the hydraulic pressure chamber 44a of the fourth clutch 44 and an accumulator chamber 492 of an accumulator 490 for the clutch $C_4$. The brake port 226 is connected through a passage 227 with the S port 276 of the 3-4 shift valve 270. The brake port 228 is connected through a passage 229 with an accumulator chamber 532 of an accumulator 530 for the brake $B_2$, and is further connected through a passage 231 with the inside hydraulic pressure chamber 48a of the second brake 48. The port 232 is connected through a passage 233 with a port of a $C_1$ control valve 300. The clutch port 234 is connected through a passage 235 with the hydraulic chamber 38a of the first clutch 38.

Also referring to FIG. 4, the 3-4 shift valve 270 comprises a spool element 272, and in addition to the above-mentioned ports further comprises a clutch port 282 and a brake port 284. When no hydraulic pressure is supplied to the hold port 278 while a hydraulic pressure is supplied to the control port 288, the spool element 272 is shifted downward in the figure to a descended shift position as shown in the right half portion thereof by overcoming the spring force of a compression coil spring 286 so as to connect the clutch port 282 with the drain port 280, and the brake port 284 with the D port 274. In contrast, when a hydraulic pressure is supplied to the hold port 278, or when no control pressure is supplied to the control port 288, the spool element 272 is shifted upward in the figure to an ascended shift position as shown in the left half portion thereof by the hydraulic pressure supplied to the port 278 and/or the spring force of the compression coil spring 286 so as to connect the clutch port 282 with the D port 274, and the brake port 284 with the S port 276.

The D port 274 is connected through the passage 207 with the D port 196 of the manual shift valve 190. The passage 207 includes a parallel connection of the throttling orifice 201 and a check ball type one way valve 209. The one way valve 209 allows hydraulic fluid to flow only from the D port 196 of the manual shift valve 190 to the D port 274 of the 3-4 shift valve 270 and prevents the hydraulic fluid to flow in the reversed direction. The one way valve 209 and the throttling orifice 201 constitute the one way delay passage.

The clutch port 282 is connected through a passage 290 with the $C_1$ control valve 300. The brake port 284 is connected through a passage 292 with the hydraulic pressure chamber 46a of the first brake 46 and an accumulator chamber 512 of an accumulator 510 for the brake $B_1$.

The first solenoid valve 400 and the second solenoid valve 410 are normally open type valves which open their ports when not energized and close their ports when energized. The manner of energization of these solenoid valves is shown in FIG. 2 in relation with the speed stages to be set up. In FIG. 2 a circle (O) indicates energization of the corresponding solenoid valve.

The first solenoid valve 400 is constantly supplied with the line pressure from the primary regulator valve 80 and is connected through a passage 408 with the control port 261 of the 2-3 shift valve 240 and is also connected through a passage 406 with a port of the C1 control valve 300.

The second solenoid valve 410 is supplied with the line pressure from the D port 196 of the manual shift valve 190 and is connected through a passage 418 with the control port 238 of the 1-2 shift valve 210 and further through the passage 239 with the control port 288 of the 3-4 shift valve 270, and still further through a passage 416 with the hold port 340 of the 4-3 control valve 330, so as to supply a hydraulic pressure to the control port 238 and 288 and the hold port 340 when it is energized.

The $C_1$ control valve 300 is a clutch control valve for controlling the engaging speed of the first clutch 38. In more detail, as shown in FIG. 5, the $C_1$ control valve 300 has a spool element 302 adapted to be shifted between an upper shift position as shown in a left half portion thereof in the figure under the spring force of a compression coil spring 316 when no hydraulic pressure is supplied to a control port 314 so as to interrupt connection between ports 304 and 308 and connection between ports 306 and 312 while connecting the port 306 with a port 310 and a lower shift position as shown in the right half portion thereof in the figure against the spring force of the compression coil spring 316 when the control port 314 is supplied with a hydraulic pressure so as to connect the port 304 with the port 308 and the port 306 with the port 312.

As described above, the port 312 is connected through the passage 233 with the port 232 of the 1-2 shift valve 210, while the port 308 is connected through a passage 328 throttled at a part thereof by an orifice 327, a passage 329 and an orifice 451 with an accumulator chamber 452 of an accumulator 450 for the clutch $C_1$, and further through a passage 468 and a one way valve 469 with the hydraulic pressure chamber 38a of the first clutch 38. The port 310 is connected through a passage 324 throttled at a part thereof by an orifice 325 with the passage 329, and is also connected through a passage 326 with a port 334 of a 4-3 control valve 330.

Figure 5:
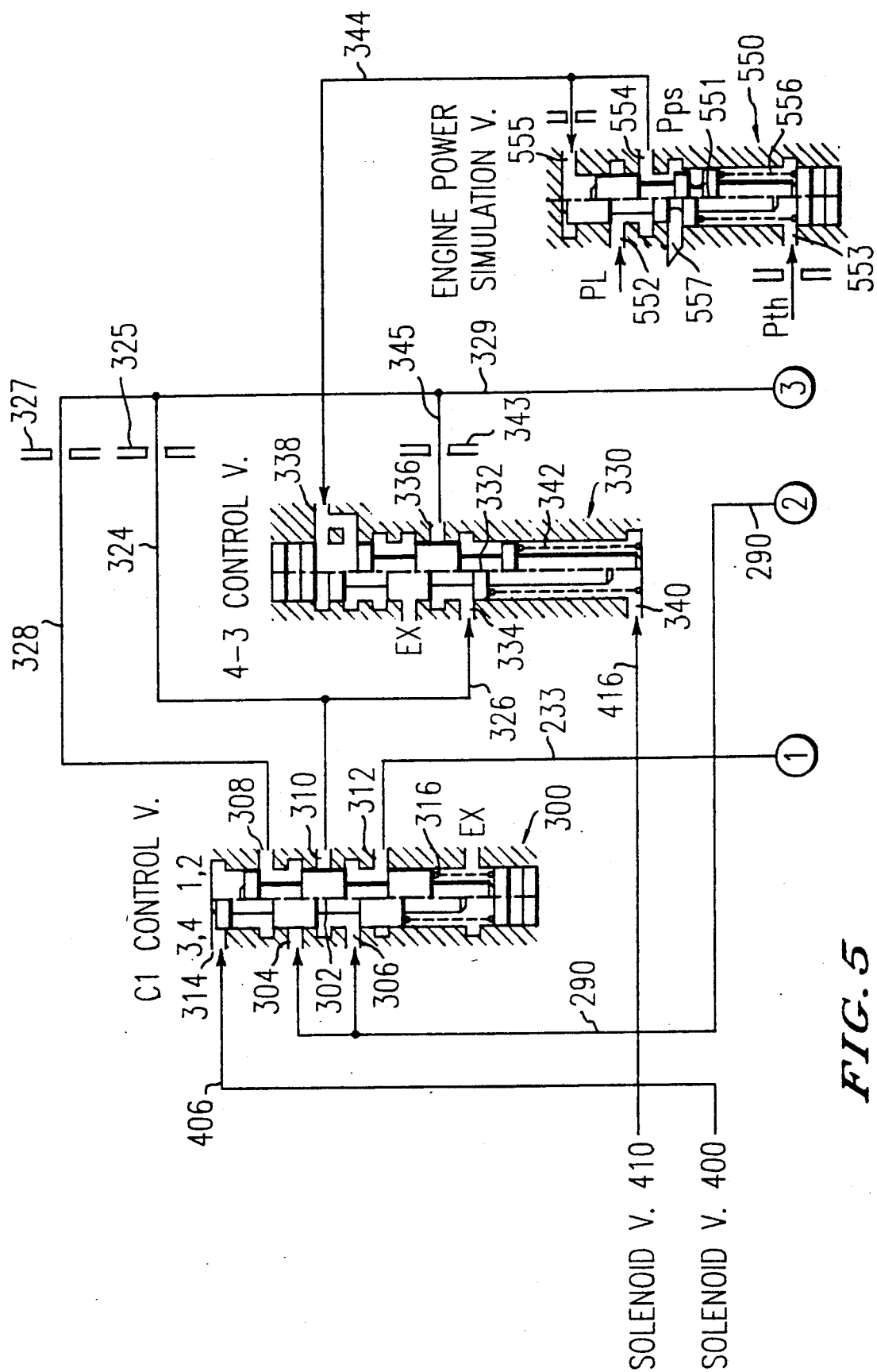

The 4-3 control valve 330 has, as shown in FIG. 5, a spool element 332 adapted to be movable between an ascended position shown in a left half portion thereof in the figure when a hold port 340 is supplied with a hydraulic pressure and a descended position as shown in a right half portion thereof in the figure against the spring force of a compression coil spring 342 when a control port 338 is supplied with a hydraulic pressure so as to interrupt connection between ports 334 and 336. The spool element 332 is in the upper position as shown in the left half portion thereof in the figure in other operation conditions, so that the port 334 is connected with the port 336. The control port 338 is connected through a passage 344 with an engine power simulation valve 550 so as to be supplied with an engine power simulation pressure which varies in accordance with engine output power.

The port 336 is connected through a passage 345 having a throttling orifice 343 with the passage 329. The throttling ratio of the orifice 343 is smaller than that of the throttling orifice 325.

The hydraulic pressure chamber 38a of the first clutch 38 is directly connected with the clutch port 282 of the 3-4 shift valve 270 by bypassing the C1 control valve 300, the 4-3 control valve, and the throttling orifices 325, 327, 343 and 451.

The one way valve 289 is oriented to allow the hydraulic fluid to flow from the hydraulic pressure chamber 38a of the first clutch 38 to the clutch port 282 of the 3-4 shift valve 270 and to prevent the reverse flow of the hydraulic fluid.

The reverse inhibition valve 360 is supplied with the line pressure from the R port 202 of the manual valve 190 through the passage 203, and is switched over according to opening or closing of the third solenoid valve 420 so as to be at an inhibit position where a spool 362 is shifted up as shown in a left half portion thereof when the vehicle is running forward at a speed greater than a predetermined value and to be in a non inhibition position where the spool element 362 is shifted down as shown in the right half portion thereof during other operating conditions while allowing the line pressure from the passage 203 to flow to the passage 398 toward the hydraulic pressure chamber 42a of the third clutch 42, to the passages 396 and 394 toward the R port 230 of the 1-2 shift valve 210, and also to the passage 396, a $B_2$ sequence valve 610 and the passage 392 toward the outside hydraulic pressure chamber 48b of the second brake 48.

The $B_2$ sequence valve 610 operates in response to the hydraulic pressure in the inside hydraulic pressure chamber 48a of the second brake 48 so as to connect the passage 396 with the passage 392 so that the outside hydraulic pressure chamber 48b is supplied with the hydraulic pressure when the hydraulic pressure in the inside hydraulic pressure chamber 48a is greater than a predetermined value.

Accumulators 450, 470, 490, 510 and 530 are back pressure control type accumulators having back pressure chambers 454, 474, 494, 514 and 534, respectively. The hydraulic pressure supplied to these back pressure chambers is controlled by an accumulator control valve 560.

The accumulator control valve 560 is supplied with a duty hydraulic pressure controlled by a duty solenoid valve 590 and the hydraulic pressure from the engine power simulation valve 550 to change its output control pressure.

The duty solenoid valve 590 is supplied with a pulse signal having a determinate duty ratio and cylically opens and closes according to the duty ratio so as to control a modulate hydraulic pressure from a duty control valve 580 according to the duty ratio. The duty hydraulic pressure controlled by the duty solenoid valve 590 for the accumulator control valve 560 is rectified of its pulses by a duty pressure accumulator 600.

The engine power simulation valve 550 is supplied with the throttle pressure from the throttle valve 120 so as to control the hydraulic pressure supplied to the accumulator control valve 560 and the 4-3 control valve 330 in accordance with the throttle pressure.

The supply of the converter pressure to the ports 60a and 60b of the fluid torque converter 60 is controlled by a lock up relay valve 140.

The lock up relay valve 140 is switched over according to a selective supply of a hydraulic pressure from a lock up signal valve 160. The lock up relay valve 140 supplies oil toward an oil cooler 170. The hydraulic pressure in the passage including the oil cooler 170 is limited by a cooler by-pass valve 172 and a relief valve 174.

The lock up signal valve 160 is supplied with a hydraulic pressure from the clutch port 224 of the 1-2 shift valve 210 and is switched over in accordance with on and off of the third solenoid valve 420 so as to supply the hydraulic pressure supplied from the clutch port 224 to the lock up relay valve 140 and to engage the lock up clutch 68 when the third solenoid valve 420 is energized.

The third solenoid valve 420 is selectively energized as shown in FIG. 2 for inhibiting engagement of the lock up clutch 68 in the reverse stage when the manual shift valve is shifted to the R range and when the manual shift valve is sifted to the D range.

The operation of the hydraulic control device according to the present invention will now be described principally with respect to the speed change operation in the D range.

First, the operation in the first speed stage will be described. In the first speed stage the first solenoid valve 400 and the second solenoid valve 410 are both energized, and therefore the control port 261 of the 2-3 shift valve 240, the control port 238 of the 1-2 shift valve 210 and the control port 288 of the 3-4 shift valve 270 are supplied with the hydraulic pressure. Therefore, the plug element 244 and the spool element 242 of the 2-3 shift valve 240 are shifted to the descended shift position shown in the right half portion thereof, and the spool element 212 of the 1-2 shift valve 210 is shifted to the descended shift position shown in the left half portion thereof. Therefore, the line pressure from the D port 196 of the manual shift valve 190 is supplied through the passage 204, the D port 246 of the 2-3 shift valve 240, the fail safe port 260, and the passage to the hold port 278 of the 3-4 shift valve 270. The 3-4 shift valve 270 is supplied with the hydraulic pressure at the control port 288. However, since the hold port 278 is also supplied with the hydraulic pressure, the spool element 272 is shifted to the ascended shift position shown in the left half portion thereof by the spring force of the compression coil spring 286.

Thus the D port 274 is connected with the clutch port 282, and therefore the line hydraulic pressure supplied from the D port 196 of the manual shift valve 190 is supplied through the passage 207, the D port 274, the clutch port 282, the passage 290 to the port 304 and 306 of the $C_1$ control valve 300. The line hydraulic pressure to be transmitted from the manual shift valve 190 to the 3-4 shift valve 270 through the passage 207 is transmitted through the throttling orifice 201 and the one way valve 209 with no delay being caused in the transmittance of the hydraulic pressure. Since at this time the control port 314 of the $C_1$ control port 300 is supplied with the hydraulic pressure, the spool element 302 of the $C_1$ control valve 300 is positioned in the descended shift position as shown in the right half portion thereof in the figure, connecting the port 304 with the port 308 and the port 306 with the port 312, and therefore the hydraulic pressure supplied to the port 304 and 306 is conducted through the passages 328 and 233. At this time the spool element 212 of the 1-2 shift valve 210 is shifted to the descended shift position as shown in the left half portion thereof in the figure, with the port 232 being obstructed, so that the hydraulic pressure is conducted through the passage 328 and the orifice 327 to the passage 329, and then through the orifice 451, the accumulator chamber 452 of the accumulator 450 for the $C_1$ clutch, the passage 468, the one way valve 469 to the hydraulic pressure chamber 38a of the first clutch 38 to engage it. Since the throttling ratio of the orifice 327 is smaller than that of the orifices 325 and 343, the supply of the hydraulic pressure to the pressure chamber 38a is carried out relatively quickly, so that the first clutch 38 is relatively quickly engaged to set up the first speed stage in the D range.

Next, the second speed stage will be described. In this speed stage the first solenoid valve 400 is only energized, so that the control port 261 of the 2-3 shift valve 240 only is still supplied with the hydraulic pressure. Therefore, the plug element 244 and the spool element 242 of the 2-3 shift valve 240 remain in the descended shift position, whereas the spool element 212 of the 1-2 shift valve 210 is shifted to the ascended shift position shown in the right half portion thereof by the spring force of the compression coil spring 236. In the 3-4 shift valve 270 the hydraulic pressure in the control port 288 disappears and the spool element 272 still remains at the ascended shift portion shown in the left half portion thereof by the hydraulic pressure supplied to the hold port 278 and the spring force of the compression coil spring 286. By the shifting over of the 1-2 shift valve 210 the D port 214 is now connected with the clutch port 224 so that the line pressure from the D port 196 of the manual shift valve 190 is supplied to the passage 225 to the hydraulic pressure chamber 44a of the fourth clutch 44 which is then engaged. Thus the first clutch 38 and the fourth clutch 44 are engaged, thereby setting up the second speed stage of the D range.

In this stage, by the shifting of the spool element 212 of the 1-2 shift valve 210 to the ascended shift position the port 232 is connected with the clutch port 234, and the hydraulic pressure from the port 312 is conducted through the passage 235 directly to the hydraulic pressure chamber 38a of the first clutch 38. However, since the hydraulic pressure chamber 38a has already been supplied with the hydraulic pressure of the same pressure level as the above-mentioned hydraulic pressure, the engaging condition of the first clutch 38 does not change.

Next, the third speed stage will be described. In this speed stage the first solenoid valve 400 and the second solenoid valve 410 are both not energized, so that the control port 238 of the 1-2 shift valve 210 and the control port 261 of the 2-3 shift valve 240 are both not supplied with hydraulic pressure. Therefore, the plug element 244 and the spool element 242 of the 2-3 shift valve 240 are lifted to the ascended shift position as shown in the left half portion in the figure by the spring force of the compression coil spring 262, whereby the D port 246 of the 2-3 shift valve 240 is isolated from the fail safe port 260 thereof and is connected with the clutch port 254. Thus the line pressure from the D port 196 of the manual shift valve 190 is conducted through the passage 263 to the hydraulic pressure chamber 40a of the second clutch 40 which is then engaged. In the 3-4 shift valve 270, although the hold port 278 is no longer supplied with the hydraulic pressure, the spool element 272 still remains in the ascended shift position by the spring force of the compression coil spring 286. In the 1-2 shift valve 210, the spool element 212 remains in the ascended shift position as in the second speed stage. Therefore, in addition to the first clutch 38 and the fourth clutch 44 the second clutch 40 is now engaged, thereby setting up the third speed stage of the D range.

In the third speed stage the spool element 302 of the C₁ control valve 300 is positioned in its ascended position as shown in the left half portion thereof in the figure under no energization of the first solenoid valve 400, so that the ports 304 and 312 are closed while only the port 306 is connected with the port 310. Therefore the hydraulic supply passage to the first clutch 38 is switched over. However, since the pressure level of the hydraulic pressure supplied to the hydraulic pressure chamber 38a is the same, the engaging condition of the first clutch 38 does not change.

Next, the fourth speed stage will be described. In this speed stage the second solenoid valve 410 only is energized. Therefore, the control port 238 of the 1-2 shift valve 210 and the control port 288 of the 3-4 shift valve 270 are supplied with the hydraulic pressure. In the 1-2 shift valve 210 the hold port 220 is supplied with the hydraulic pressure from the clutch port 254 of the 2-3 shift valve 240 through the passage 264. Therefore, in spite of the supply of the hydraulic pressure to the control port 238 the spool element 212 remains in the ascended second shift position shown in the right half portion thereof in the figure by the spring force of the compression coil spring 236. However, in the 3-4 shift valve 270, since the hold port 278 is connected through the passage 268 and the fail safe port 260 of the 2-3 shift valve 240 to the drain port 253, the spool element 272 is shifted downward in the descended shift position by the hydraulic pressure supplied to the control port 288 by overcoming the spring force of the compression coil spring 286. Therefore, the D port 274 is connected with the brake port 284 instead of the clutch port 282 which is now connected to the drain port through the port 280. Thus the hydraulic pressure chamber 38a of the first clutch 38 is now exhausted of the hydraulic pressure, and the first clutch 38 is disengaged. Instead the line pressure is supplied to the hydraulic pressure chamber 46a of the first brake 46 which is now engaged. Therefore, the second clutch 40, the fourth clutch 44 and the first brake 46 are engaged, thereby setting up the overdrive fourth speed stage of the D range.

When the transmission is shifted down from the fourth speed stage to the third speed stage under engine driving, that is a kickdown from the fourth speed stage to the third speed stage, the spool element 302 of the C₁ control valve 300 remains at its ascended position as shown in the left half portion thereof in the figure, and therefore the port 306 only is connected with the port 310, so that the hydraulic pressure from the clutch port 282 of the 3-4 shift valve 270 is supplied through the passage 290, the ports 306 and 310 to the passages 324 and 326. In the downshifting under engine driving the throttle opening is relatively high. Therefore, the engine power simulation pressure generated by the engine power simulation valve 550 is relatively high, and therefore the spool element 332 of the 4-3 control valve 330 applied with this relatively high engine power simulation hydraulic pressure at the control port 338 is shifted to the descended position as shown in the right half portion thereof in the figure against the spring force of the compression coil spring 342. Therefore, the port 334 is interrupted from the port 336, and therefore the hydraulic pressure from the port 310 is conducted only through the passage 324 having the throttling orifice 325 to the passage 329. Then the hydraulic pressure is conducted through the throttling orifice 451, the accumulator chamber 452 of the accumulator 450 for the C₁ clutch, the passage 468 and the one way valve 469 to the hydraulic pressure chamber 38a of the first clutch 38. In this state, therefore, the first clutch 38 is engaged relatively slowly according to the throttling ratios of the orifices 325 and 451 and the accumulator characteristic of the accumulator 450. Thus it is avoided that in the downshifting from the fourth speed stage to the third speed stage the first clutch 38 is substantially engaged before the one way clutch 34 is engaged as a result of a rising up of the engine rotational speed, so that the speed stage shifting is completed with no substantial speed shifting shock to occur due to engine braking arising from engagement of the clutch $C_1$.

When the transmission is shifted down from the fourth speed stage to the third speed stage by the prohibition of the overdrive stage under light or non engine driving, the engine power simulation pressure supplied to the control port 338 of the 4-3 control valve 330 is relatively low because the throttle opening would be of the order of idling opening, and therefore the spool element 332 of the 4-3 control valve 330 is positioned at its ascended position as shown in the left half portion thereof in the figure under the spring force of the coil spring 342, with the port 334 being connected with the port 336. In this state the passage 329 is supplied with the hydraulic pressure also through the passage 345 in addition to the passage 324, and since the throttling ratio of the orifice 343 in the passage 345 is smaller than that of the orifice 325 in the passage 324, the speed of supplying the hydraulic pressure to the hydraulic pressure chamber 38a of the first clutch 38 is higher as compared with the case where the hydraulic pressure is supplied only through the passage 324, and therefore the first clutch 38 is put into engagement in an early stage as compared in the kickdown from the fourth speed stage to the third speed stage. In the downshifting under such non engine driving the first one way clutch 34 is not put into engagement since there would be no rising up of the engine rotational speed, and therefore if the engagement of the first clutch 38 is delayed, the vehicle will be put into an inertial running condition during the speed stage shifting as if in the running under the neutral shift position. However, by the first clutch 38 being quickly engaged as described above, the occurrence of such an inertial running condition is avoided and the normal engine brake available operating condition is obtained with no delay.

In the kickdown from the fourth shift stage to the second speed stage the first solenoid valve 400 is energized so as to supply a hydraulic pressure to the control port 314 of the $C_1$ control valve 300, so that the spool element 302 is shifted to the descended position as shown in the right half portion thereof in the figure, thereby the port 304 being connected with the port 308 while the port 306 being connected with the port 312. In this state the spool element 212 of the 1-2 shift valve 210 is in the ascended position as shown in the right half portion thereof in the figure with the port 232 being connected with the clutch port 234, and therefore the hydraulic pressure from the port 312 of the $C_1$ control valve 300 is conducted through the passage 233, the port 232, the clutch port 234 and the passage 235 directly to the hydraulic pressure chamber 38a of the first clutch 38 while bypassing the accumulator, thus the first clutch 38 being immediately engaged. Thus it is ensured that the first clutch 38 is engaged so as to provide a required substantial torque transmission before the second clutch 40 is completely disengaged, thereby avoiding an abnormal revving up of the input rotational speed and thereby also ensuring a desirable speed stage shifting with no speed stage shifting shocks.

When the first clutch 38 is disengaged in upshifting from the third speed stage to the fourth speed stage, in accordance with the shifting of the spool element 272 of the 3-4 shift valve to the descended shift position the hydraulic pressure in the hydraulic pressure chamber 38a of the first clutch 38 is conducted through the one way valve 289 toward the clutch port 282 of the 3-4 shift valve 270, and further through the drain port 280, the passage 268, and the fail safe port 260 of the 2-3 shift valve 240 to the drain port 253 with no substantial delay being incurred to the exhaustion of the hydraulic pressure. Thus the hydraulic pressure chamber 38a is quickly exhausted of the hydraulic pressure so that the upshifting is carried out at high responsiveness.

When the first clutch 38 which is operating in the third speed stage is disengaged by the shifting of the manual shift valve from the D range to the N range, in accordance with such shifting of the manual shift valve 190 the D port 196 is connected with the drain port 199, and also in accordance with the shifting of the spool element 272 of the 3-4 shift valve 270 to the ascended shift position the hydraulic pressure in the hydraulic pressure chamber 38a of the first clutch is exhausted through the first one way valve 289 to the clutch port 282 of the 3-4 shift valve 270, and further through the D port 274 and the passage 207 to the D port 196 of the manual shift valve 190, and then exhausted through the drain port 199. The flow of the hydraulic fluid through the passage 207 from the 3-4 shift valve 270 to the manual shift valve 190 is conducted only through the throttling orifice 201 as obstructed by the one way valve 209, and therefore the flow of the fluid is applied with a substantial delay corresponding to the throttling ratio of the throttling orifice 201. Therefore, in this state the disengagement of the first clutch 38 is carried out with an appropriate delay as compared with the upshifting from the third speed stage to the fourth speed stage, and thus it is avoided that any substantial shocks to occur by the manual shift change from the D range to the N range.

Although the invention has been described with respect to a particular embodiment thereof, it will be clear to those skilled in the art that the present invention is not limited to the shown embodiment and various embodiments are possible within the scope of the present invention.

TABLE 1

| | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | 0 | | | | | (0) | 0 | 0 |
| 2nd Speed Stage | 0 | | | 0 | (0) | | | 0 |
| 3rd Speed Stage | (0) | 0 | | 0 | | | 0 | |
| 4th Speed Stage | | 0 | | 0 | 0 | | | |
| Reverse Stage | | | 0 | | | 0 | | |

TABLE 2

| | Speed Change Gear Ratio |
|---|---|
| 1st Speed Stage | $(1 + r_2)/r_2$ |
| 2nd Speed Stage | $\{(1 + r_2)/r_2\} - \{1/r_2(1 + r_1)\}$ |
| 3rd Speed Stage | 1 |
| 4th Speed Stage | $1/(1 + r_1)$ |
| Reverse Stage | $-1/r_1$ |

We claim:

1. In an automatic transmission for a vehicle such as an automobile having a speed stage shifting mechanism including parallelly arranged first and second hydraulically operated input clutches and adapted to provide a certain first speed stage in which said first and second input clutches are both engaged and a certain second speed stage higher than said first speed stage in which said first input clutch is disengaged and said second input clutch is engaged, said certain first speed stage being set up with engine braking when said first input clutch is engaged, wherein said certain first speed stage may be set up without engine braking when said first input clutch is not engaged,
- a hydraulic control device comprising a hydraulic pressure supply control means for variably controlling speed of supply of a hydraulic pressure to said first input clutch according to conditions for engaging said first input clutch so as to variably provide a certain substantial delay in supplying the hydraulic pressure to said first input clutch, and a hydraulic pressure exhaustion control means for controlling speed of exhaustion of a hydraulic pressure from said first input clutch during shifting from said certain first speed stage to said certain second speed stage, independently of said hydraulic pressure supply control means, said hydraulic pressure exhaustion control means including a first hydraulic control system means operative to exhaust said first input clutch substantially instantly.

2. A hydraulic control device according to claim 1, wherein said hydraulic pressure exhaustion control means variably controls said speed of exhaustion of the hydraulic pressure from said first input clutch according to conditions for disengaging said first input clutch.

3. A hydraulic control device according to claim 1, wherein said hydraulic pressure exhaustion control means controls speed of exhaustion of the hydraulic pressure from said first input clutch to be substantially higher than speed of supply of the hydraulic pressure to said first input clutch controlled by said hydraulic pressure supply control means.

4. A hydraulic control device according to claim 2, wherein said hydraulic pressure exhaustion control means controls speed of exhaustion of the hydraulic pressure from said first input clutch to be relatively higher in disengaging said first input clutch for upshifting from said first speed stage to said second speed stage than in disengaging said first input clutch due to shifting of a manual shift range from a drive range to a neutral range.

5. A hydraulic control device according to claim 1, further comprising a passage means and a manual valve adapted to be manually shifted between a D position for supplying a source hydraulic pressure in said passage means so as to supply the source hydraulic pressure toward said first input clutch and an N position for draining said passage means, said hydraulic pressure exhaustion control means including a second hydraulic control system means including said passage means and said manual valve operative to exhaust said first input clutch through said passage means when said manual valve is shifted to said N position, said passage means including a unidirectional throttling means which applies a substantially greater throttling effect to a flow of hydraulic fluid flowing therethrough in a direction from said first input clutch toward said manual valve than in a direction opposite thereto.

* * * * *